US010059607B2

(12) United States Patent
Hoffmann et al.

(10) Patent No.: US 10,059,607 B2
(45) Date of Patent: Aug. 28, 2018

(54) ELECTROLYSIS ELECTRODE

(71) Applicant: California Institute of Technology, Pasadena, CA (US)

(72) Inventors: Michael R. Hoffmann, South Pasadena, CA (US); Kangwoo Cho, Seoul (KR)

(73) Assignee: The California Institute of Technology, Pasadena, CA (US)

( * ) Notice: Subject to any disclaimer, the term of this patent is extended or adjusted under 35 U.S.C. 154(b) by 247 days.

(21) Appl. No.: 14/607,204

(22) Filed: Jan. 28, 2015

(65) Prior Publication Data
US 2016/0009574 A1    Jan. 14, 2016

Related U.S. Application Data

(60) Provisional application No. 62/023,098, filed on Jul. 10, 2014, provisional application No. 62/039,729, filed on Aug. 20, 2014.

(51) Int. Cl.
| | |
|---|---|
| *C25B 11/04* | (2006.01) |
| *C25B 11/06* | (2006.01) |
| *C25B 11/08* | (2006.01) |
| *C02F 1/461* | (2006.01) |

(Continued)

(52) U.S. Cl.
CPC ........ *C02F 1/46109* (2013.01); *C02F 1/4674* (2013.01); *C25B 11/0442* (2013.01); *C02F 2001/46133* (2013.01); *C02F 2001/46138* (2013.01); *C02F 2101/30* (2013.01); *C02F 2305/023* (2013.01); *C25B 11/041* (2013.01); *C25B 11/0405* (2013.01); *C25B 11/0415* (2013.01); *C25B 11/0447* (2013.01); *C25B 11/0452* (2013.01); *C25B 11/0473* (2013.01);
(Continued)

(58) Field of Classification Search
CPC ....... C02F 1/46109; C02F 2001/46138; C25B 11/0405
See application file for complete search history.

(56) References Cited

U.S. PATENT DOCUMENTS

| | | | |
|---|---|---|---|
| 6,527,939 B1 | 3/2003 | Hardee et al. | |
| 2001/0042682 A1 | 11/2001 | Weres et al. | |

(Continued)

FOREIGN PATENT DOCUMENTS

| | | | | |
|---|---|---|---|---|
| JP | 58136790 | * 10/1983 | ............. | C25B 11/10 |

OTHER PUBLICATIONS

Xu et al, "A Study on the Deactivation of an Iro2—Ta2O5 Coated Titanium Anode," Corrosion Science 2003 45(12):2729-2740.*

(Continued)

*Primary Examiner* — Brian W Cohen
*Assistant Examiner* — Salil Jain
(74) *Attorney, Agent, or Firm* — Gavrilovich, Dodd & Lindsey LLP

(57) ABSTRACT

A water purification anode has a first semiconductor contacting a second semiconductor at a heterojunction. The second semiconductor includes $TiO_2$ and excludes bismuth and niobium. The first semiconductor includes iridium. In some instances, the anode includes a current collector in direct physical contact with the first semiconductor. The anode can be arranged in water such that at least one face of the second semiconductor is in direct physical contact with the water.

9 Claims, 4 Drawing Sheets

(51) Int. Cl.
*C02F 1/467* (2006.01)
*C02F 101/30* (2006.01)

(52) U.S. Cl.
CPC ....... *C25B 11/0478* (2013.01); *C25B 11/0484* (2013.01)

(56) References Cited

U.S. PATENT DOCUMENTS

| | | | |
|---|---|---|---|
| 2006/0223700 A1* | 10/2006 | Jung | B01J 21/063 502/350 |
| 2007/0000774 A1 | 1/2007 | Weres | |
| 2012/0090988 A1 | 4/2012 | Li et al. | |
| 2012/0279872 A1* | 11/2012 | Chen | C02F 1/325 205/758 |

OTHER PUBLICATIONS

Min, In Gyou, International Search Report and Written Opinion, PCT/US2015/013193, Korean Intellectual Property Office, dated May 7, 2015.

Moon, Kihwan, International Preliminary Report on Patentability and Written Opinion, PCT/US2015/013193, The International Bureau of WIPO, dated Jan. 19, 2017.

\* cited by examiner

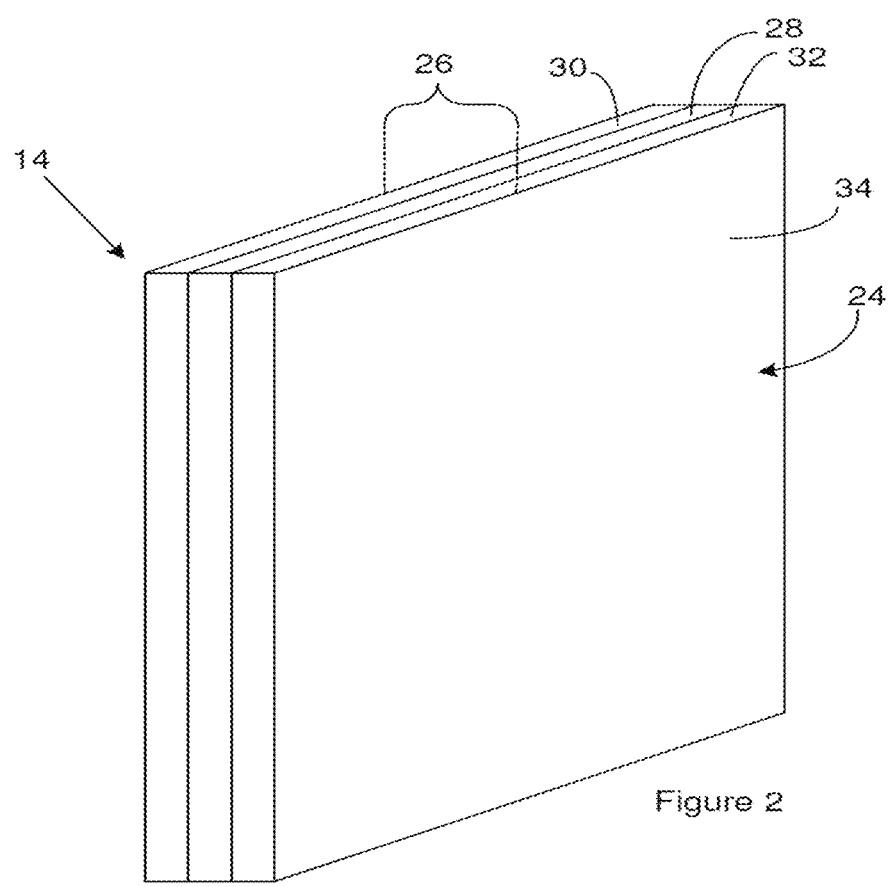
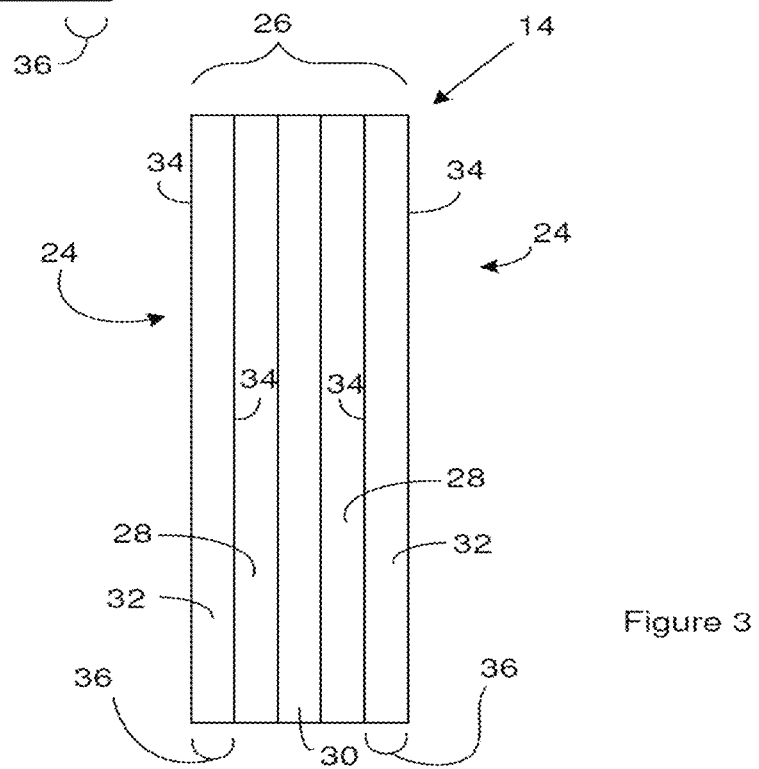

ELECTROLYSIS ELECTRODE

CROSS REFERENCE TO RELATED APPLICATIONS

This Application claims the benefit of U.S. Provisional Patent Application Ser. No. 62/023,098, filed on Jul. 10, 2014, and incorporated herein in its entirety and this Application also claims the benefit of U.S. Provisional Patent Application Ser. No. 62/039,729, filed on Aug. 20, 2014, and incorporated herein in its entirety.

FIELD OF THE INVENTION

The present invention relates to electrolysis, and more particularly, to electrodes for electrolysis.

BACKGROUND

Systems are being proposed for the electrolysis of organic materials in an electrolyte. Examples of these systems include wastewater treatment systems that employ electrolysis to purify wastewater. These systems apply a potential between an anode and a cathode that are in each contact with the wastewater. The anodes in these systems often have a layer of semiconductor that contacts the wastewater. The semiconductor often includes one or more components that dissolve into the wastewater during operation of the system. Dissolution of the semiconductor components reduces the service life of the anode. Further, the ability of many of the anodes to purify water depends on the ability of the anode to generate Reactive Chlorine Species (RCS) in the water. However, these anodes generally generate reactive chlorine species at rates that are not desirable for commercialization of the technology. As a result, there is a need for improved electrolyte purification anodes.

SUMMARY

A water purification anode has a first semiconductor contacting a second semiconductor at a heterojunction. The second semiconductor includes $TiO_2$ and excludes bismuth and niobium. The first semiconductor includes iridium. In some instances, the anode includes a current collector in direct physical contact with the first semiconductor.

The anode can be used in systems that purify water having organic pollutants. The anode can be arranged in the water such that at least one face of the second semiconductor is in direct physical contact with the water.

A method of operating a system for electrolysis of water includes contacting the anode with water that includes organic materials. The method also includes applying an anodic potential to the anode at a level that is sufficient to generate hydroxyl radicals bound to the surface of the anode. In some instances, the hydroxyl radicals that are bound to the surface of the anode are physisorbed to the surface of the anode.

The disclosure provides a water purification system, comprising an anode having a first semiconductor contacting a second semiconductor at a heterojunction, at least one face of the second semiconductor being in direct contact with water that includes organic materials, the second semiconductor including $TiO_2$ and excluding bismuth and niobium, and the first semiconductor including iridium. In one embodiment, the second semiconductor excludes Sb, F, Cl, Sb, Mo, W, Nb, and Ta. In another embodiment, the second semiconductor excludes dopants. In yet another embodiment, the second semiconductor consists of $TiO_2$. In another embodiment, the first semiconductor is in direct contact with a current collector. In another embodiment, the first semiconductor includes oxygen. In a further embodiment, the first semiconductor includes one or more stabilizing elements selected from the group consisting of Ta, Si, Sn, Ti, Sb, and Zr. In yet another embodiment, the first semiconductor includes tantalum. In a further embodiment, the first semiconductor consists of iridium, tantalum, and oxygen. In another embodiment, the first semiconductor excludes bismuth and niobium. In a further embodiment, the first semiconductor excludes dopants. In another embodiment, hydroxyl radicals are physisorbed to the at least one face of the anode.

The disclosure also provide a water purification anode, comprising a first semiconductor contacting a second semiconductor at a heterojunction, at least one face of the second semiconductor being in direct contact with water that includes organic materials, the second semiconductor including $TiO_2$ and excluding bismuth, and the first semiconductor including iridium. In one embodiment, the second semiconductor excludes Sb, F, Cl, Sb, Mo, W, Nb, and Ta. In another embodiment, the second semiconductor excludes dopants. In yet another embodiment, the second semiconductor consists of $TiO_2$. In still another embodiment, the anode includes a current collector in direct contact with the first semiconductor.

The disclosure also provides a method of operating a water purification system, comprising contacting an anode with water that includes organic materials; and applying to the anode an anodic potential that is sufficient to generate hydroxyl radicals bound to the surface of the anode, the anode including a first semiconductor contacting a second semiconductor at a heterojunction, the second semiconductor including $TiO_2$ and excluding bismuth and niobium, and the first semiconductor including iridium. In one embodiment, the second semiconductor excludes Sb, F, Cl, Sb, Mo, W, Nb, and Ta. In another embodiment, the second semiconductor excludes dopants.

BRIEF DESCRIPTION OF THE FIGURES

FIG. 2 is a perspective view of an anode.

FIG. 3 is a cross section of another embodiment of an anode.

DETAILED DESCRIPTION

Figure 1:
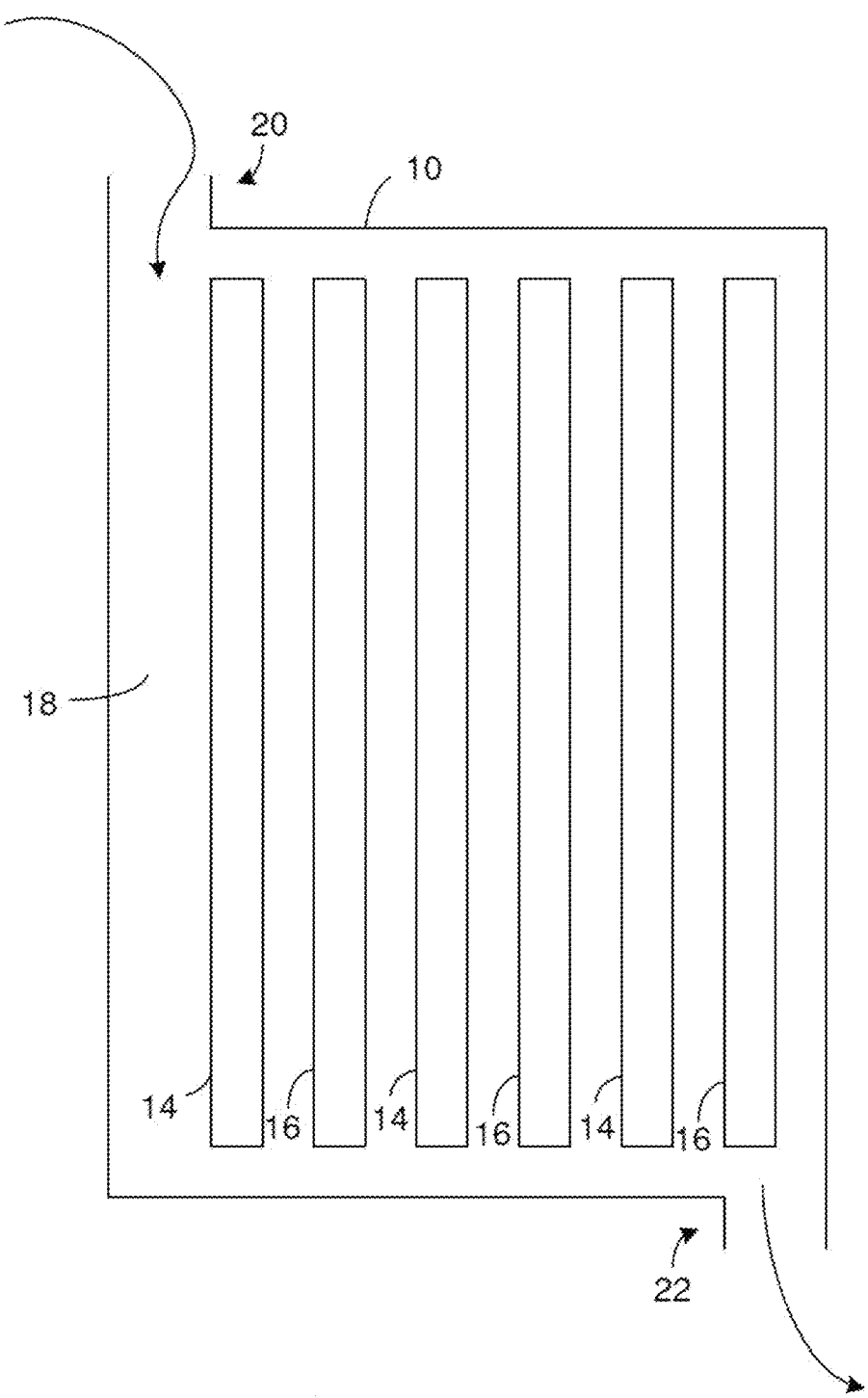
FIG. 1 illustrates an electrolysis system such as a continuous water purification system.

As used in this specification and the appended claims, the singular forms "a," "an," and "the" include plural referents unless the content clearly dictates otherwise.

Unless defined otherwise, all technical and scientific terms used herein have the same meaning as commonly understood by one of ordinary skill in the art to which the invention pertains. Although any methods and materials similar or equivalent to those described herein can be used in the practice for testing of the invention(s), specific examples of appropriate materials and methods are described herein.

Also, the use of "or" means "and/or" unless stated otherwise. Similarly, "comprise," "comprises," "comprising"

"include," "includes," and "including" are interchangeable and not intended to be limiting.

It is to be further understood that where descriptions of various embodiments use the term "comprising," those skilled in the art would understand that in some specific instances, an embodiment can be alternatively described using language "consisting essentially of" or "consisting of."

All publications mentioned herein are incorporated herein by reference in full for the purpose of describing and disclosing the methodologies, which are described in the publications, which might be used in connection with the description herein. The publications discussed above and throughout the text are provided solely for their disclosure prior to the filing date of the present application. Nothing herein is to be construed as an admission that the inventors are not entitled to antedate such disclosure by virtue of prior disclosure.

A system for purification of water having organic materials includes an anode for use in a wastewater electrolysis system. The anode includes a first semiconductor and a second semiconductor that contact one another at a heterojunction. The second semiconductor interacts with the water being purified. The second semiconductor includes, consists of, or consists essentially of $TiO_2$ and the first semiconductor includes oxygen and iridium. The anode has a surprisingly high rate of Reactive Chlorine Species (RCS) generation. Since many wastewater electrolysis systems use RCS to degrade organic materials, these anodes are highly suitable for use in these systems. Further, dopants introduced into the second semiconductor can be oxidized at the surface of the anode and can accordingly decrease service life of the anode. The second semiconductor can exclude dopants and/or exclude bismuth and niobium. The removal of these dopants from the second semiconductor can increase the service life of the anode and reduce the costs of the anodes. As a result, the anodes offer the possibility of extended service lives, reduced costs, and elevated RCS production rates.

Additionally, prior water purification anodes have a sealing layer between a precoat semiconductor layer and an overcoat semiconductor layer. The sealing layer was believed to improve adhesion of the overcoat to the precoat and accordingly prevented the water from coming into direct contact with the precoat through openings in the overcoat. Direct contact between the precoat and the electrolyte was believed to allow electrical current to flow directly from the precoat through the water rather than through the overcoat as is needed for proper operation of these anodes. The inventors have found that a surprising level of performance improvement can be achieved by eliminating the sealing layer.

FIG. 1 illustrates an example of a suitable electrolysis system such as a water purification system. The system includes a vessel 10 having a reservoir. Anodes 14 and cathodes 16 are positioned in the reservoir such that anodes 14 and cathodes 16 alternate with one another. The anodes 14 and cathodes 16 are parallel or substantially parallel with one another. An electrolytic medium 18 is positioned in the reservoir such that anodes 14 and the cathodes 16 are in contact with the electrolytic medium 18. The electrolytic medium 18 includes one or more electrolytes and can be a liquid, a solution, a suspension, or a mixture of liquids and solids. In one example, the electrolytic medium 18 is wastewater that includes organic materials and chloride ($Cl^-$). The chloride can be present in the electrolytic medium 18 as a result of adding a salt to the electrolytic medium 18 or the electrolytic medium 18 can include urine that is a natural source of the chloride. The electrolysis system also includes a voltage source configured to drive an electrical current through the anodes 14 and cathodes 16 so as to drive a chemical reaction in the electrolytic medium 18.

The electrolysis system illustrated in FIG. 1 includes an inlet 20 and an outlet 22. The electrolysis system can operate as a continuous reactor in that the electrolytic medium 18 flows into the reservoir through the inlet 20 and out of the reservoir through the outlet 22. Alternately, the electrolysis system can also be operated as a batch reactor. When the electrolysis system is operated as a batch reactor, the electrolytic medium 18 can be a solid, a liquid, or a combination.

FIG. 2 illustrates an anode 14 that is suitable for use in an electrolysis system. The anode 14 has faces 24 connected by one or more edges 26. During operation of the anode 14, at least one of the faces of the second semiconductor 32 contacts the electrolytic medium 18. The anode 14 includes a first semiconductor 28 between a current collector 30 and a second semiconductor 32. The first semiconductor 28 contacts the second semiconductor 32 at a heterojunction. The first semiconductor 28 contacts the current collector 30. The second semiconductor 32 has faces 34 connected by one or more edges 36. In some instances, at least one of the faces is in direct physical contact with the electrolytic medium. Although the current collector 30 is illustrated a sheet or foil, the current collector 30 can be a porous material such as a mesh or fabric. In some instances, the current collector 30 is embedded in the first semiconductor 28 rather than the first semiconductor 28 being a layer positioned on a face of the current collector 30. Suitable materials for the current collector 30 include valve metals such as Ti.

The first semiconductor 28 can serve one or more functions selected from the group consisting of passivating the current collector 30, serving as electron shuttle between the second semiconductor 32 and the current collector 30, and decreasing the ohmic resistance of the electron transfer between the second semiconductor 32 and the current collector 30. In some instances, direct contact between the current collector 30 and the second semiconductor 32 would result in a Schottky barrier to the transfer of electrons from the second semiconductor 32 to the current collector 30. The first semiconductor 28 can be selected such that the energy barrier for electron transfer from the second semiconductor 32 to the current collector 30 through the first semiconductor 28 is less than the energy barrier that would result from electron transfer from the second semiconductor 32 directly to the current collector 30.

The second semiconductor 32 is selected such that hydroxyl radicals are formed at the surface of the second semiconductor 32 upon application of a sufficient electrical potential gradient across the interface of the second semiconductor 32 and the electrolytic medium 18. For instance, the second semiconductor 32 can include, consists of, or consists essentially of a metal oxide such as titanium dioxide. When these metal oxides are exposed to water and a sufficient electrical gradient is applied across the interface of the anode 14 and the electrolytic medium 18 hydroxyl radicals are produced at the surface of the metal oxide. The hydroxyl radicals can be surface bound and can be represented by $MO_x(.OH)$ where M represents a metal element or a combination of metal elements and x is greater than or equal to one. The hydroxyl radicals are generally surface bound by physisorption but can also be chemisorbed on the surface.

The first semiconductor 28 can include, consist of, or consist essentially of a first metal oxide that includes, consists of, or consists essentially of oxygen, one or more electroactive metal elements and optionally one or more stabilizing elements. Examples of electroactive elements include, but are not limited to, Ir, Ru, Ni, Mn, and Co. Examples of stabilizing elements include, but are not limited to, Ta, Si, Sn, and Ti. Accordingly, the first semiconductor 28 can include, consist of, or consist essentially of a first metal oxide that includes, consists of, or consists essentially of oxygen, one or more electroactive metal elements selected from the group consisting of Ir, Ru, Pt, Ni, Mn, Co, Fe, and Pb and one or more stabilizing elements selected from the group consisting of Ta, Si, Sn, Ti, Sb, and Zr. As an example, the first metal oxide can include, consist of, or consist essentially of oxygen, iridium and one or more stabilizing elements selected from the group consisting of Ta, Si, Sn, Ti, Sb, and Zr. In one example, the first metal oxide includes, consists of, or consists essentially of oxygen, iridium and tantalum. In some instances, the first metal oxide includes, consists of, or consists essentially of oxygen and one or more electroactive metal elements selected from the group consisting of Ir, Ru, Pt, Ni, Mn, Co, Fe, and Pb. In some instances, the first metal oxide includes oxygen and iridium. In one example, the first metal oxide includes oxygen, tantalum and iridium. For instance, the first metal oxide can be represented by $Ir_{0.7}Ta_{0.2}O_y$, where y is greater than 0 or 2 and/or less than 2.5 or 10.

The second semiconductor 32 can include, consist of, or consist essentially of a second metal oxide that includes, consist of, or consists essentially of oxygen and one or more elements selected from group IV. In some instances, the second semiconductor 32 includes, consists of, or consists essentially of oxygen and titanium. For instance, the second semiconductor 32 can include, consist of, or consist essentially of titanium dioxide ($TiO_2$).

The outermost layer of prior wastewater purification anodes have included metal oxides that are doped. Examples of dopants used with these metal oxides include, but are not limited to, dopants such as Bi, Nb, Sb, F, Cl, Sb, Mo, W, Nb, and Ta. While a semiconductor such as annealed $TiO_2$ is highly stable and substantially insoluble in water even at the high anodic potential needed to generate hydroxyl radicals, these dopants are often soluble in wastewater themselves. Additionally or alternately, dopants such as bismuth are oxidized at the surface of the anode 14 during the operation of the anode 14. This oxidation can shorten the service life of the anode 14. Accordingly, the second semiconductors 32 disclosed above and/or the second metal oxides disclosed above can exclude dopants. In one example, the first semiconductor 28 and/or the first metal oxide excludes bismuth and niobium. In another example, the first semiconductor 28 and/or the first metal oxide excludes Bi, Nb, Sb, F, Cl, Sb, Mo, W, Nb, and Ta. In another example, the first semiconductor 28 and/or the first metal oxide excludes dopants.

Although FIG. 2 illustrates the first semiconductor 28 and the second semiconductor 32 on one side of the current collector 30, the first semiconductor 28 and the second semiconductor 32 can be positioned on both sides of the current collector 30 as shown in the anode cross section of FIG. 3.

In some instances, the current collector 30 is optional and the first semiconductor 28 serves as the current collector 30 for the anode 14.

Although the second semiconductor 32 is positioned to interact directly with the electrolytic medium 18, the anode 14 can include layers in addition to the first semiconductor 28 and the second semiconductor 32. For instance, one or more additional layers can be positioned over the second semiconductor 32 such that the second semiconductor 32 is between the first semiconductor 28 and the one or more additional layers. In these instances, at least one of the faces of the second semiconductor 32 directly contacts the electrolytic medium 18. For instance, the one or more additional layers can be a porous layer that allows a liquid electrolytic medium 18 to come into direct contact with a face of the second semiconductor.

Figure 4:
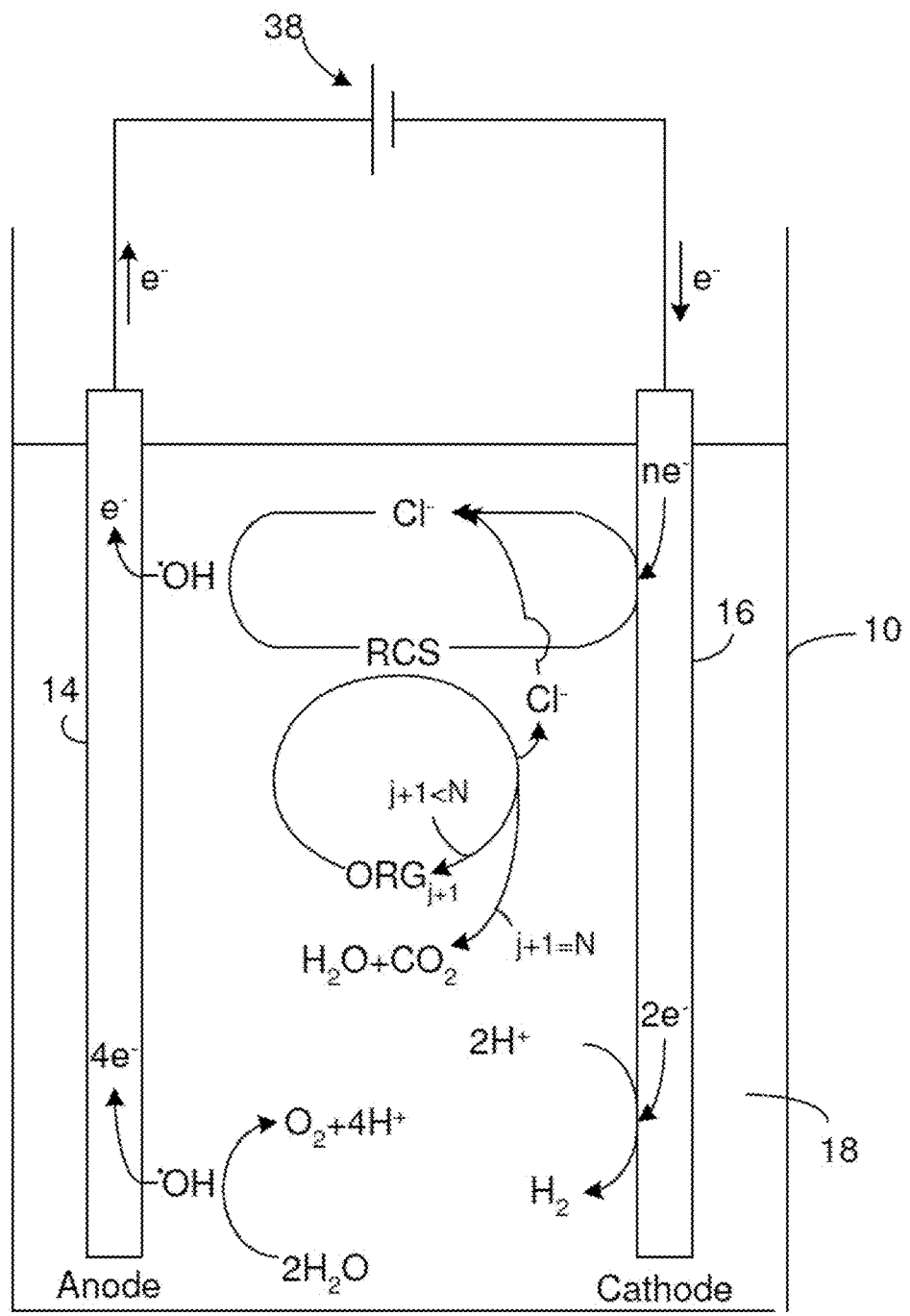
FIG. 4 illustrates a simplified mechanism for a water purification system.

FIG. 4 is a simplified illustration of the mechanism for a water purification system that makes use of advanced oxidation processes (AOP) to break organic materials into small and stable molecules such as water and $CO_2$. For the purposes of simplification, a single anode 14 and cathode 16 are illustrated although additional anodes 14 and/or cathodes 16 can be employed. The water purification system can be used to purify wastewater. Wastewater includes the organic materials that are normally associated with waste products and chloride that is naturally present in urine. Accordingly, wastewater can naturally operate as an electrolytic medium 18 or an electrolyte can optionally be added to the wastewater.

The details of the anode 14 construction are not illustrated; however, the second metal oxide included in the second semiconductor is labeled $MO_x$ where M represents one or more metal elements and x is greater than 0 and is at least partially determined by the overall oxidation state of M. In some instances, M is greater than 0, 0.5, or 1 and/or less than 10 and/or a molar ratio O:M is less than 100:1, 10:1, 5:1, or 2:1. When the second semiconductor includes $TiO_2$, M represents Ti and x represents 2.

During operation of the water purification system, an anodic potential is applied to the anode 14 at a level that is sufficient to generate surface bound hydroxyl radicals in accordance with the following reaction: $MO_x + H_2O \rightarrow MO_x(\cdot OH) + H^+ + e^-$. The hydroxyl radical generation reaction is not shown in FIG. 4; however, the resulting hydroxyl radicals are illustrated on the surface of the anode 14. The electrons released by the hydroxyl radical generation reaction enter the anode 14 and travel toward the voltage source 38. The protons released by the hydroxyl radical generation reaction remain in the electrolytic medium 18 and can be transported to the cathode 16 where they are reduced so as to generate hydrogen gas.

FIG. 4 illustrates oxidation of water at the surface of the anode 14. FIG. 4 also illustrates the chlorine cycle where chloride is oxidized at the anode surface so as to generate Reactive Chlorine Species (RCS). The reactive chlorine species are reduced at the cathode surface to generate chloride. Reactive chlorine species are free chlorine plus chlorine radicals. Examples of free chlorine include, but are not limited to, $Cl_2$, HOCl, and $ClO^-$. Examples of chlorine radicals include, but are not limited to, Cl. and the radical ion $Cl_2.^-$.

In one example of the chlorine cycle, chloride reacts with a hydroxyl radical at the anode surface so as to generate HOCl in the electrolytic medium 18 and $MO_x$ at the anode surface. The HOCl is an acid (hypochlorous acid) that accordingly partially dissociates into a proton ($H^+$) and hypochlorite ($ClO^-$) in the electrolytic medium 18. Hypochlorite and water can react at the surface of the cathode 16 to generate a chloride and a hydroxyl ion that each receives an electron from the cathode 16. In another part of the chlorine cycle, the chloride is oxidized at the anode surface to generate an atomic chlorine radical (Cl.) in the electrolytic medium 18. The atomic chlorine radical can interact with chloride to form the radical ion $Cl_2.^-$. The radical ion $Cl_2.^-$ can be reduced at the cathode surface to generate two chlorides in the electrolytic medium 18. The hypochlorous acid, hypochlorite, atomic chlorine radical, and radical ion $Cl_2.^-$ serve as Reactive Chlorine Species (RCS).

FIG. 4 also illustrates the organic species degradation cycle in the electrolyte. The organic material goes through a series of reactions that can convert the organic material into multiple fragments. The reactions continue for N reaction cycles until the fragments are all converted into small and stable molecules such as $H_2O$ and $CO_2$. In FIG. 4, the variable j represents the number of reaction cycles that an organic compound (ORG) has experienced. Accordingly, $ORG_0$ represents the organic compound before the organic compound has reacted with the RCS and $ORG_1$ represents the one or more fragments of the organic compound that remain after the first reaction with the RCS. As is illustrated, each of the N−1 reaction cycle reacts $ORG_1$ with one or more RCS and generates one or more chlorides in the electrolytic medium 18. The Nth reaction cycle reacts $ORG_{N-1}$ with one or more RCS to generate small stable molecules such as $H_2O$ and $CO_2$. In some instances, the small stable molecules such as $H_2O$ and $CO_2$ are also generated earlier in the reaction cycle. In one example, during each reaction cycle, at least one radical ion $Cl_2.^-$ reacts with $ORG_j$ and generates $ORG_{j+1}$ and one or more chlorides in the electrolytic medium 18.

Although the system of FIG. 4 illustrates degrading of organic materials through reactions between the organic materials and the RCS, the organic materials can also be degraded through direct oxidation of the organic materials or organic material fragments at the surface of the anode 14. This direct mechanism can be in addition to the reaction with RCS or an alternative to the RCS reactions.

EXAMPLES

Example 1

A first anode was prepared. A Ti metal sheet (3×2 $cm^2$, 0.5 mm thickness) served as the substrate. The substrate was pretreated by sequentially sandblasting, degreasing with 50 V/V % acetone, and etching in boiling 10 M/V % oxalic acid right before fabrication. A layer of $Ir_{0.7}Ta_{0.3}O_y$ served as the first semiconductor. The $Ir_{0.7}Ta_{0.3}O_y$ was formed on the substrate by sequentially forming several sub-layers of the $Ir_{0.7}Ta_{0.3}O_y$. Each sub-layer was prepared by brushing precursor (70 mM $H_2IrCl_6$+30 mM $TaCl_5$ in 1:1 ethanol and isopropanol) on both sides of the substrate, drying the result at 80° C. (10 min) and annealing at 525° C. for 10 min. This same technique was repeated so as to form five additional sub-layers. The result was further heat treated at 525° C. for 1 hour as a final annealing. The result had the first semiconductor loading of 0.64 mg $cm^{-2}$ average over the surface of the current collector.

A layer of $TiO_2$ served as the second semiconductor. The layer of $TiO_2$ was formed by sequentially forming several sub-layers of $TiO_2$ on top of one another. The first sub-layer of $TiO_2$ was formed by brushing a precursor solution (250 mM $TiOSO_4$ and 312.5 mM $H_2SO_4$ in 1:1 ethanol+water solution) onto the first semiconductor on both sides of the substrate. The result was dried at 80° C. for 10 min and then annealed at 425° C. for 10 min. This same technique was repeated so as to form seven additional sub-layers such that each additional sub-layer was formed on the previously formed sub-layer. The result was further annealed at 425° C. for 1 hour and the result served as a first anode.

Example 2

A second anode was prepared. The substrate and first semiconductor were prepared as disclosed in Example 1. A layer of $TiO_2$ served as the second semiconductor. The layer of $TiO_2$ was formed by sequentially forming several sub-layers of $TiO_2$ on top of one another. The first sub-layer of $TiO_2$ was formed by brushing a precursor solution (250 mM $TiOSO_4$ with 0.5 M glycolic acid in 1:1V isopropanol and water solution) onto the first semiconductor on both sides of the substrate. The result was dried at 80° C. for 10 minutes and then annealed at 425° C. for 10 minutes. This same technique was repeated so as to form seven additional sub-layers such that each additional sub-layer was formed on the previously formed sub-layer. The result was further annealed at 425° C. for 1 hour and the result served as a second anode.

Example 3

A third anode was prepared. The substrate and first semiconductor were prepared as disclosed in Example 1. A layer of $TiO_2$ served as the second semiconductor. The layer of $TiO_2$ was formed by sequentially forming several sub-layers of $TiO_2$ on top of one another. A precursor for the first sub-layer of $TiO_2$ was formed by dissolving 1.6 M $TiOSO_4$ in 2 M $H_2SO_4$ and neutralizing the result by adding 50% KOH. The resulting precipitates were harvested by centrifugation and glycolic acid was added (Ti:glycolic acid=1:1). The mixture was stirred at 75° C. for 2-3 days to achieve a complete dissolution. The resulting solution was diluted to have a final Ti concentration of 250 mM. The resulting precursor solution was brushed onto the first semiconductor on both sides of the substrate. The result was dried at 80° C. for 10 min and then annealed at 425° C. for 10 minutes. This same technique was repeated so as to form seven additional sub-layers such that each additional sub-layer was formed on the previously formed sub-layer. The result was further annealed at 425° C. for 1 hour and the result served as a third anode.

Example 4

A fourth anode was prepared. The substrate and first semiconductor were prepared as disclosed in Example 1. A layer of $TiO_2$ served as the second semiconductor. The layer of $TiO_2$ was formed by sequentially forming several sub-layers of $TiO_2$ on top of one another. The precursor for the first sub-layer of $TiO_2$ was formed by adding titanium butoxide (250 mM of final concentration) and glycolic acid (375 mM) into a relevant amount of water. The resulting precipitates were re-dissolved with 30 W/W % $H_2O_2$ (ca. 40% of final precursor volume). Exothermic reactions with a presence of dark red color appeared with vigorous generations of $CO_2$ and $O_2$ bubbles. In order to adjust the pH to be circum-neutral, small aliquot of concentrated $NH_4OH$ (ca. 3.5% of final precursor volume) was added. The color quickly changed into yellow with the pH adjustment while mild bubble generations (including $N_2$) continued with a decay of residual $H_2O_2$. The resulting precursor solution was brushed onto the first semiconductor on both sides of the substrate. The result was dried at 80° C. for 10 min and then annealed at 425° C. for 10 min. This same technique was repeated so as to form seven additional sub-layers such that each additional sub-layer was formed on the previously formed sub-layer. The result was further annealed at 425° C. for 1 hour and the result served as the second anode.

Example 5

A first comparative anode was generated having only the first semiconductor on the substrate. The substrate and first semiconductor were prepared as disclosed in Example 1.

Example 6

A second comparative anode was generated with a structure that is known for use in wastewater electrolysis. The anode has multiple layers on a substrate. In particular, the anode has a precoat on the substrate, a sealcoat on the precoat, a slurry coat on the sealcoat, and an overcoat on the slurry coat. The overcoat is the outermost layer of the anode and contacts the electrolyte during operation of the system.

A Ti metal sheet (3×2 cm$^2$, 0.5 mm thickness) served as the substrate. The precoat was $IrO_2/Ta_2O_5$ at a Ir:Ta molar ratio of 67:33. The seal coat was $SnO_2/Bi_2O_3$ at a Sn:Bi molar ratio of 90:10. The slurry coat was Bi doped $TiO_2$ at a Ti:Bi molar ratio of 96:4. The overcoat was $TiO_2/Bi_2O_3$ at a Ti:Bi molar ratio of 70:30.

Example 7

The performance of the anodes was tested using a system such as the system disclosed in the context of FIG. 1. The system included a stainless steel cathode (3×2 cm$^2$, 5 mm distance) in parallel with one of the anodes from examples 1 through 5. The system also included a Ag/AgCl/Sat. KCl reference electrode (Basi Inc.). The electrolyte was a 50 mM NaCl solution. These components were arranged in a reservoir having a working volume of about 60 mL with a Vycor® glass tip of the reference electrode being 3 mm apart from the center of the anode.

An anodic potential (Ea) was applied between the anode and cathode so as to perform potentiostatic electrolysis. The potential was applied from a potentiostat (SP-50, Biologic). The anodic potential was converted to the normal hydrogen electrode (NHE) scale by Ea (NHE)=Ea (Ag/AgCl)+0.197 V. The rate and current efficiency of Reactive Chlorine Species (RCS) generation were estimated at different Ea; 2.0, 2.5, and 3.0 V. The RCS concentration was measured by DPD (N,N-diethyl-p-phenylenediamine) reagent at a fixed time interval (2 minutes) for three times with proper dilutions. The current efficiency for the RCS generation was estimated by $\eta RCS=2VFd[Cl_{DPD}]/Idt$ where V is electrolyte volume (0.06 L), F is Faraday constant (96485.3 C mol$^{-1}$), $[Cl_{DPD}]$ is the concentration of RCS (M), I is current (A), and t is electrolysis time (sec). The results of these tests are presented in the following Table 1.

TABLE 1

| | Anodic Potential (V NHE) | First Comparative Anode | Second Comparative Anode | First Anode | Second Anode | Third Anode | Fourth Anode |
|---|---|---|---|---|---|---|---|
| Current Density (A/m$^2$) | 2.0 | 188 | 122 | 151 | 145 | 146 | 141 |
| | 2.5 | 356 | 293 | 291 | 309 | 263 | 258 |
| | 3.0 | 530 | 450 | 441 | 427 | 421 | 425 |
| Current Efficiency (%) | 2.0 | 53.0 | 25.7 | 69.6 | 82.8 | 81.7 | 84.7 |
| | 2.5 | 52.2 | 29.3 | 70.7 | 75.5 | 82.2 | 86.1 |
| | 3.0 | 53.8 | 29.9 | 72.5 | 83.2 | 71.1 | 84.0 |
| Reactive Chlorine Evolution Rate (mmol/m$^2$s) | 2.0 | 0.516 | 0.137 | 0.546 | 0.616 | 0.616 | 0.618 |
| | 2.5 | 0.963 | 0.402 | 1.07 | 1.19 | 1.12 | 1.15 |
| | 3.0 | 1.60 | 0.586 | 1.74 | 1.86 | 1.55 | 1.84 |

For a given Anodic Potential, Table 1 shows differences between the results achieved for the first through fourth anodes. These differences are believed to be a result of the anodes having different second semiconductor surface areas that result from differences in the compositions of the precursors used to generate the anodes.

Table 1 shows that the current density for the first comparative anode is higher than the current density measured for each of the other anodes. This result is believed to be a result of the electrical resistance across the one or more hetero-junctions that are present in each of the other anodes but not presenting the first comparative electrode. The current density for the first through fourth anodes are comparable with the current density through the second comparative anode. However, the current efficiency achieved by the first through fourth anodes are surprisingly (~30-60%) higher than the current efficiency achieved by the first comparative anode and about 2 to 3 times higher than the current efficiency achieved by the second comparative anode. Further, the rate of RCS generation was generally higher for the first through fourth anodes that was achieved with the first comparative electrode and was surprisingly higher (~2.5-4 times) than the rate achieved with the second comparative anode.

Example 8

The mechanical and chemical stability of the second comparative anode and the first through fourth anodes were tested. The second semiconductor on the first anode and the second anode were not mechanically stable and flaked off from mechanical stress (scratching). This is believed to be a result of the precursors for the first anode and the second anode being close to a suspension rather than a complete solution. In contrast, the second semiconductor included in the third anode and the fourth anode was prepared from aqueous Ti solutions and the resulting $TiO_2$ was more mechanically stable.

Figure 5:
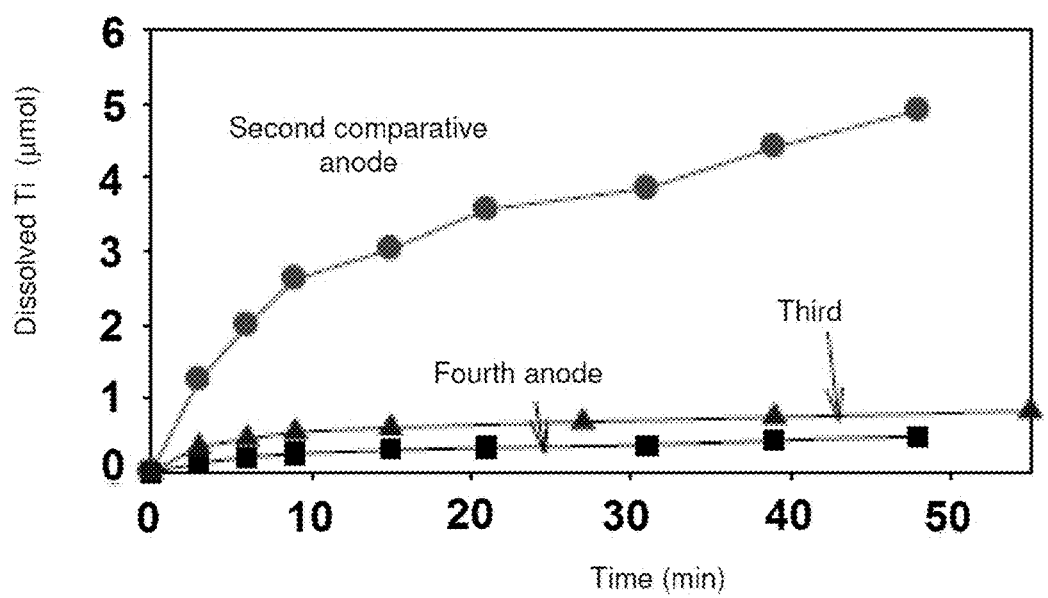
FIG. 5 is a graph comparing the long-term chemical stability of the disclosed anodes with prior anodes.

The chemical stability of the second comparative anode and the first through fourth anodes were tested using accelerated life tests. Cells were generated such that each cell included one of the anodes aligned with a stainless steel cathode (0.5×2 cm$^2$) at a distance of 3 mm in a 1 M NaClO$_4$ solution (electrolytic medium) in conical tubes. A Neware Battery Testing System powered a galvanostatic electrolysis in each cell at a current density of 1 A/cm$^2$. The electrolytic medium was replaced in 3 to 5 hour intervals and dissociated amounts of Ti, Bi, and Ir in the electrolyte were quantified by Agilent inductivity coupled plasma-mass spectrometry (ICP-MS). FIG. 5 is a plot of the level of dissolved Ti versus electrolysis time for the second comparative anode, the third anode, and the fourth anode.

FIG. 5 shows that the second comparative anode showed much faster dissolution of the Ti than was shown by either the third anode or the fourth anode. The rapid dissolution of the Ti in the second comparative anode is believed to be a result of the oxidation of the Bi on the surface of the anode. The third anode did illustrate a higher Ti dissolution rate than the fourth anode. It is believed that the additional stability achieved by the fourth anode may be a result of the third anode having a reduced level of crystallinity in the second semiconductor. A comparison of the results shown in Table 1 with FIG. 5 indicates that the fourth anode provided the highest level of RCS generation, mechanical stability, and chemical stability.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. A water purification system, comprising:
   an anode having a first material comprising $Ir_{0.7}Ta_{0.3}O_y$, wherein y is less than 10, contacting a second material consisting of $TiO_2$ at a heterojunction,
   at least one face of the second material being in direct contact with water that includes organic materials,
   the second material excluding bismuth and niobium.

2. The system of claim 1, wherein the first material is in direct contact with a current collector and the second material contacts the first material at the heterojunction.

3. The system of claim 1, wherein the first material includes one or more stabilizing elements selected from the group consisting of Ta, Si, Sn, Ti, Sb, and Zr.

4. The system of claim 1, wherein the first material consists of iridium, tantalum, and oxygen.

5. The system of claim 1, wherein the first material excludes bismuth and niobium.

6. The system of claim 5, wherein the first material excludes dopants.

7. The system of claim 1, wherein hydroxyl radicals are physisorbed to the anode.

8. A water purification anode, comprising:
   a current collector having a first face and second face;
   a first material having a first face and a second face, said first face of the first material in contact with one of the first face or second face of the current collector;
   a second material having a first face and a second face, said first face of the second material contacting the second face of the first material at a heterojunction,
   the second face of the second material being in direct contact with water that includes organic materials,
   the second material consisting of $TiO_2$, and
   the first material comprising $Ir_{0.7}Ta_{0.3}O_y$, wherein y is less than 10.

9. A method of operating a water purification system, comprising:
   contacting an anode with water that includes organic materials; and
   applying to the anode an anodic potential that is sufficient to generate hydroxyl radicals bound to the surface of the anode,
   the anode including a first material contacting a second material at a heterojunction,
   the second material consisting of $TiO_2$, and
   the first material comprising $Ir_{0.7}Ta_{0.3}O_y$, wherein y is less than 10.

* * * * *